United States Patent [19]
Kawecki et al.

[11] Patent Number: 5,963,625
[45] Date of Patent: Oct. 5, 1999

[54] METHOD FOR PROVIDING CALLED SERVICE PROVIDER CONTROL OF CALLER ACCESS TO PAY SERVICES

[75] Inventors: Michael Anthony Kawecki, South Bound Brook; Thomas Andrew Lees, Great Meadows; Michael Anthony Scott, Matawan; Lawrence S. West, Jr., Long Valley, all of N.J.

[73] Assignee: AT&T Corp, New York, N.Y.

[21] Appl. No.: 08/723,708

[22] Filed: Sep. 30, 1996

[51] Int. Cl.⁶ .................................................. H04M 15/00
[52] U.S. Cl. ........................ 379/114; 379/121; 379/127; 705/26; 705/39
[58] Field of Search ..................... 379/111, 112, 379/114, 115, 120, 121, 127, 196, 93.02, 93.03, 93.07, 93.12; 705/26, 29, 30, 32, 33, 34, 39, 40

[56] References Cited

U.S. PATENT DOCUMENTS

| | | | |
|---|---|---|---|
| 5,023,904 | 6/1991 | Kaplan et al. | 379/91 |
| 5,146,491 | 9/1992 | Silver et al. | 379/114 |
| 5,276,444 | 1/1994 | McNair | 379/112 |
| 5,311,572 | 5/1994 | Friedes et al. | 379/67 |
| 5,524,142 | 6/1996 | Lewis et al. | 379/112 |
| 5,615,408 | 3/1997 | Johnson et al. | 455/416 |
| 5,619,556 | 4/1997 | Richardson et al. | 379/88 |
| 5,729,594 | 3/1998 | Klingman | 379/93.12 |
| 5,732,400 | 3/1998 | Mandler et al. | 705/26 |
| 5,794,221 | 8/1998 | Egendorf | 705/40 |

*Primary Examiner*—Paul Loomis
*Assistant Examiner*—BInh K. Tieu

[57] ABSTRACT

A method for providing called service provider control of caller access to pay services provides for the establishment of service provider criteria controlling whether a particular call to a pay service provider is blocked or passed through a toll network to the pay service provider. For example, an undesirable ANI table is established for all callers who are undesirable for one reason or another, for example, if they have not paid for previously ordered products or pay for information service calls. Moreover, a pay service provider may establish a minimum call score and a caller score table whereby a caller having a good payment history may accumulate a high caller score. The caller score is compared with the minimum call score and the call blocked if the minimum call score is not exceeded. Moreover, by providing the method of pay service processing as close to call origination as possible, required preamble and other announcements are provided from this origination point rather than from the service provider location.

27 Claims, 2 Drawing Sheets

| CCS AND MCS TABLE 202 | | | | 202a |
|---|---|---|---|---|
| CCS TABLE 201 | | MCS TABLE | | PRODUCT CODE |
| ANI/ACCT | CALLER CREDIT SCORE | DIALED NUMBER | MINIMUM CREDIT SCORE | |
| 908-234-5605 | 2 | 900-555-1000 | 1 | |
| 908-234-6232 | 3 | 900-555-2000 | 4 | |
| 047775 | 1 | 900-555-3000 | 2 | |
| 908-949-3804 | 4 | 900-555-4000 | 3 | |
| 614-979-6677 | 1 | 900-555-5000 | 1 | |
| 919-433-3322 | 0 | 900-555-6000 | 3 | |
| 919-433-9876 | 7 | 900-555-7000 | 6 | |

METHOD FOR PROVIDING CALLED SERVICE PROVIDER CONTROL OF CALLER ACCESS TO PAY SERVICES

TECHNICAL FIELD

This invention relates generally to the field of pay telecommunications services including, or example, pay per product and pay for information services provided through 1-900 calling and, more particularly, to a method for providing called service provider control of caller access to such services via the toll network.

BACKGROUND OF THE INVENTION

Service providers provide products for sale over the telecommunications network and thereby obtain a revenue stream and/or provide access to a database of desired information or to live advisors typically for a fee. These pay services may include pay per product services such as home shopping or catalog services and pay for information services such as government services, banking and financial services, customer services, news services, polling and surveys, fund raising, marketing and promotion opportunities, dating services, health care information services, sports score services, weather services and the like. Typically a caller dials a 1-900 telephone number and is connected through the toll network to a service bureau where there is located an automatic call distributor (ACD) for routing calls to the next available service representative. Regardless of how the call is dialed, the service provider typically takes an order for a requested product or provides the requested information.

Fees vary for pay for information services and are billed via billing services provided by the toll network carrier, by a credit agency or by the service provider itself. The pay-per-product call is typically free to the user (but its cost is accounted for in the cost of the product to the consumer). Product charges which can amount to hundreds or even thousands of dollars for jewelry or appliances are either invoiced directly by the shopping or catalog service or through a credit agency. In regard to the pay for information call, the fee for the call may be recorded by the call, for example, one dollar per call. An example of such a call might be a sports call, where the caller is interested in obtaining a sports score for a recent event. In other instances, charges can run on the order of several dollars per minute, and the calls are variable in length up to twenty, thirty, forty minutes or even longer. In yet other instances, the call charges are preselected, that is, they may run $10.00 for the first five minutes and $1.50 per minute thereafter. Thus, a single call can run on the order of a hundred dollars or more. An example of such a more expensive service might be a medical advice call.

Revenue loss suffered by pay service providers from such pay calls can be substantial due to bad collections, insufficient identity of the caller and the like. Many pay services experience high uncollectible accounts receivable, regardless of whether the call is a pay per product or a pay for information call.

Automatic number identification has helped to identify in telecommunications toll fraud those callers who would defraud the network in advance of a call. Automatic number identification provides the telephone number or credit card number of the calling party. Through a credit look-up process, the toll network service provider may determine the caller's credit history at least in respect to their toll service bill. In other words, the toll network telecommunications service provider may verify through an ANI look-up an identification of those callers with good/bad credit history. A toll call can be blocked before it is completed through the network.

On the other hand, ANI is not available in all areas. Moreover, the pay service provider does not presently have access to such a credit check, They do not generally have sufficient control over what calls are permitted to go through and thus receive service. For example, a caller may call a 900 service and, having a good toll payment history, he provides a valid credit card number. The call can go through and the product or pay information service provided, but the caller may still not pay. In other words, the caller may have a good toll call payment history and a poor history of paying for a product or information provided by a 1-900 call. Consequently, a pay information service provider has little chance of protecting itself from the event of an uncollectible pay call or delivery of a product that will not be paid for.

U.S. Pat. No. 4,756,020 to Fodale describes call blocking in a toll network environment. In respect to the completion of toll calls, a calling party may enter a billing number such as a credit card or calling card number or other personal identification in order to permit a toll call to be completed. In the event of a bad credit card, for example, a toll office may disallow an extension of an initiated call through the toll network based on an invalid credit card or one having poor credit history. An announcement may be provided of the disallowance of the call. The toll witch most commonly used in the United States toll communications network is the #4 Electronic Switching System (#4ESS) offered by Lucent Technologies, Inc. The #4ESS takes the ANI (typically the caller's telephone number) and the called party's telephone number and sends the information to a network control processor (NCP). Alternatively, when the caller is calling, for example, from a pay phone, the caller's credit card number replaces the calling telephone number as the ANI data. If the billing number (telephone number or credit card number) proves to be delinquent, the controller sends a message to the #4ESS to disallow the call, and the call is never completed to the called party, saving toll network resources.

U.S. Pat. No. 5,311,572 to Friedes et al. describes, in a toll network, how a customized billing record may be created for a subscriber and if calling party origination information (such as ANI) is insufficient to affirmatively identify the caller, the information may be supplemented through caller entered information by a prompting device which solicits, during call setup, any additional information to delineate a more precise profile of the caller and, if predetermined criteria of the toll network service provider is met, allow the call to proceed.

U.S. Pat. No. 5,023,904 to Kaplan et al. describes a direct telephone dial ordering service available through a telecommunications carrier. A special telephone number can handle up to 100 vendors and one million products per vendor. A caller calls a special exchange, the particular telephone number for a vendor (vendor number 21) and is prompted to enter an eight digit product code (or 1 million product codes per vendor) through a catalog look-up. Assuming the product code number is 55743210, a vendor number 21 and a carrier exchange number 915, then the number placed in the particular vendor's catalog is 10 915 215 5743210. The caller calls that number to obtain that product. The caller then can be prompted to order more products in the same call and/or acknowledge that the order has been received. A data processor can verify whether the calling customer is a subscribing customer by looking their telephone number up in a database and determining if their credit is satisfactory. The recovered information is batch processed and forwarded to the vendor for further processing of the orders taken. A Feature Group D Service Access Code 6-digit translation dialing plan is also described. Nevertheless, there does not appear to be any sharing of credit information in the described service and the calling scheme requires a particular dialing plan that is product code related.

Another problem for pay information service providers whose callers can accumulate more than two dollars or more in fees per call is that the Federal Communications Commission (FCC) requires that they provide a non-interruptible preamble message before any service is in fact provided. The message is to advise the caller of the fee and afford the caller the opportunity to abandon the call without invoking the fee. These announcements are presently provided at the pay information service bureau location, after the caller has been connected through the toll network to the service provider's ACD. The caller is, thus, tying up service provider and toll network equipment just to hear an announcement and may choose not to go through with the pay call.

Consequently, while call blocking in the toll network is known in the event of bad ANI or credit card entry and pay service providers may provide direct product ordering services, there remains a need in the art to provide for improved call screening or call blocking prior to the completion of a call through the toll network to a pay service provider, improved product delivery systems with greater assurance of product revenue recovery and further permit the pay service provider the opportunity to provide announcement services and perform call blocking according to their own predetermined criteria prior to call completion through the toll network to the pay service provider.

SUMMARY OF THE INVENTION

In accordance with the present invention, a plurality of pay service providers share their customer knowledge and accumulate a shared database of data regarding users of their products and services. Service providers who join in this service are known as sponsors, and one such service recently introduced by the assignee of the present invention is known as MultiQuest Telecommunications Service (R). Such an opportunity to provide a common database for similar pay services permits each pay service provider sponsor an opportunity to share caller files and thus establish a common pool of knowledge, for example, for billing and credit concerns. Moreover, each sponsor provides required announcements to the toll network service provider for common storage. The shared database is directly coupled through common control signaling or other signaling link with toll offices of the toll network. Consequently, when a caller initiates a 1-900 call to a sponsor of such a shared database, the call is intercepted at the originating or first toll office in the path of the call. From linked announcement systems, the caller can receive an announcement particularly related to the 900 pay service telephone number that they have dialed. If their automatic number identification (ANI) data is not available, insufficient, invalid or otherwise represents an identity of an undesirable caller or otherwise does not meet predetermined sponsor provided criteria, the call can either be blocked or the caller can be prompted to enter further identification information such as credit card number plus personal identification number to meet the criteria. If the caller meets predetermined criteria entered by the pay service sponsor that the caller has dialed, the call will not be blocked and may pass through the toll network. Consequently, there will be a higher incidence of collection of the charge for a product or any fee for the pay call completed to the sponsoring service provider because the caller has met predetermined criteria.

Operationally, the caller is recorded in the shared database and, at first, receives a default, preselected calling score. As the caller completes other 900 pay service calls and pays their bills, the caller receives a progressively increasing score indicating that the caller may call the pay information service provider sponsor more frequently, complete a 900 information service call of longer duration or buy more products or more expensive products from a pay-per-product vendor.

Consequently, a method for providing called service provider control of caller access to pay services comprises the steps of storing pay service provider criteria for completion of a pay service call, determining if the pay service provider criteria is met and blocking call progress if the pay service provider criteria is not met. The call blocking occurs in the telecommunications network, rather than at the pay service provider's equipment. Most often, the blocking is effected at the originating toll office location where the caller also receives customized messages from the sponsor at the initiation of a call through the toll network. Also, in the event caller identification data such as ANI data is not available, the caller is prompted for further data to satisfy the criteria. The pay service provider criteria may involve the establishment of a caller score table and a minimum score table for scoring callers and permitting service providers to establish their own level of risk in regard to uncollectible revenues.

In a pay-per product call to a pay service provider, the sponsor may bill the product to the caller on their telephone service bill with a greater incidence of collection than through a credit agency. Moreover, the pay-per-product service provider may share the same database as the pay for information service provider and set their own level of risk for such expensive products as jewelry and appliances costing much more than pay for information service calls.

These and other features of a method of providing called service provider control of caller access to pay services of the present invention will become clearer from a careful study of the drawings and the detailed description thereof which follows.

DETAILED DESCRIPTION

Figures 1, 2:
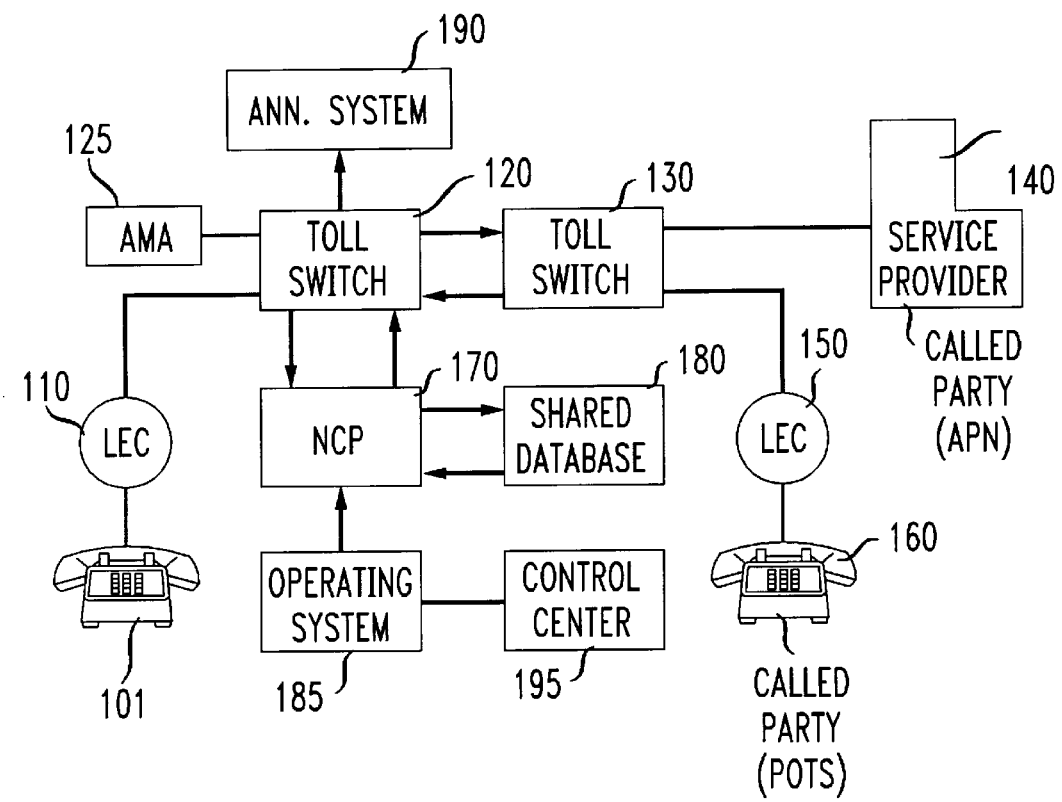
FIG. 1 represents a typical overall block diagram of a pay service call through the toll network showing a call progressing through a local exchange carrier (LEC) to a first or originating toll switch having access to a shared database and customized announcement system established by a plurality of sponsor pay service providers for implementing a method of called service party control of calls to access pay services.
FIG. 2 provides an exemplary table useful for implementing the call scoring aspect of the present disclosure.

Referring to FIG. 1, a telecommunications network environment for the method of the present invention will be described. Following a discussion of FIG. 1, each of the following aspects of the present invention will be explained: 1) call blocking via called service provider criteria, 2) caller entry of further identification data to meet the predetermined service provider criteria, for example when identification data is not made available by the LEC, 3) caller scoring as the caller pays for products ordered through a pay per product call or completes and pays for information calls, permitting the pay service provider criteria to be flexible, 4) announcement services at the initiation of a pay service call customized to the services provided by the service provider sponsor and 5) a product code feature whereby callers are enabled to automatically order products and receive billing via their phone bills while vendor sponsors are assured that impulse purchases are transacted efficiently and in keeping with their own collection risk assessment (via caller scoring). Thereafter, a flowchart for practicing a process of controlling pay service access will be described with reference to FIG. 3.

According to FIG. 1, a typical calling party 101 may be an individual or an entity and may use a personal, business, mobile, pay or other telecommunications apparatus to establish a call. The apparatus may comprise a telephone or mobile phone or personal computer or private branch exchange or other customer premises or off premises equipment. Typically, calling party 101 is coupled via a local exchange carrier (LEC) 110 to a toll network. LEC 110 operates in a local exchange area and, in regard to a particular call to a called party 160 may have invested in the call a distribution facility between the calling party 101 and LEC 110, and LEC 110 may represent one or more end offices or tandem offices for establishing local area links from calling party 101 to the originating toll switch 120.

In another embodiment (not shown), the LEC 110 is bypassed. For example, the calling party 101 may be directly connected to the originating toll switch 120 as in a cellular telephone connection to a toll switch or other LEC bypass environment. In yet another embodiment (not shown), the calling party 101 may represent a personal computer accessing the public switched telephone network through the Internet. Such access may occur at the LEC 110 or at an originating toll switch 120.

Originating toll switch 120 may comprise a #4 electronic switching system available from Lucent Technologies, Inc. or other toll switch known in the art. An originating toll switch 120 is shown directly linked to a terminating toll switch 130. In a typical toll network, a plurality of toll switches may be linked by toll trunks or other links that may comprise facilities of optical fiber, land-based microwave, satellite or other facilities known in the art (not shown). Thus, FIG. 1 is greatly simplified to only show an originating toll switch 120 and a terminating toll switch 130 and does not show details of the construction of the toll network.

Toll switch 120 is shown connected to an announcement frame system 190. Announcement system 190 provides the typical toll announcements typically and, additionally, is modified as described further herein to provide customized announcements for sponsor pay service providers. Originating toll office 120 is also shown connected to automatic message accounting (AMA) unit 125 for recording toll calls for billing purposes. Originating toll office or switch 120 is modified as further described herein to provide access to service providers via control center 195 to customize their announcements from announcement system 190. Moreover, originating toll switch 120 is modified to block calls to be completed through to a terminating toll switch 130 according to predetermined sponsor criteria stored in memory at network control point (NCP) 170 or at shared database 180.

Network control point 170 is shown only coupled to originating toll switch 120. In fact, it is a shared resource and is coupled to many, if not all, switches of a particular toll network. The NCP 170 typically comprises a programmed computer and memory and, as will be further described herein, may store a table of identification data such as telephone numbers, credit card numbers, and the like which represent invalid, insufficient, undesirable, non-paying or other callers who should be blocked from completing toll calls according to the prior art. As will be further described herein, sponsor information service providers may input data to this table and preempt blocking operations that would normally be prescribed by similar data maintained by the toll network service provider. Or, further caller identification data may be obtained, for example, by prompting announcements delivered by announcement system 190 as will be further described herein. The further data may assist the sponsor in a determination of the identity of the caller and their payment history.

Operating system 185 is typically a programmed computer and memory having access to NCP 170 for update and retrieval of stored data and control algorithms. Operating system 185 receives input from control center 195 managed by the sponsors of a service such as the MultiQuest Telecommunications Service. These all may be co-located or remotely located from one another. Sponsors represented by service provider equipment 140 may thus be connected by telecommunications or preferably protected and secure Internet links (not shown) to one another and to NCP 170.

Shared database 180 may store toll network customer information in a typical environment. It further maintains data regarding product and call payment history for customers of the sponsored pay services for each pay service sponsor. As will be further described herein, shared database 180 maintains scores for customers of the sponsored information services. As customers pay their bills for 900 pay products or information services, the scores will increase and as a result the call treatment at originating switch 120 may more likely a permit a caller to pay for more expensive or a greater quantity of products or a pay for information call to go through than not and for longer durations or more frequently.

In a typical call from calling party 101 across the toll network, calling party 101 is connected to a terminating toll switch 130 and from toll switch 130 to another local calling area and terminating local exchange carrier (LEC) 150. As already described, LEC 150 is a shorthand symbol for a local exchange network which may comprise more than one end office or tandem switch and connecting facilities. The link joining LEC 150 to calling party 160 may likewise be bypassed as may be the link between caller 101 and LEC 110. The symbol POTS under called party 160 represents plain old telephone service where calling party 101 places a typical toll call to called party 160.

In a 900 pay service call, the prefix 1-900 tells the local and toll network that this is a call requiring action point numbering (APN). A translation of the following digits at originating switch 120 tells the toll network the location of the equipment 140 of the pay service provider. Consequently, in the event of a typical APN call, the LEC 110 routes the 900 pay service call of calling party 101 to originating toll switch 120 where toll switch 120 translates the last digits of the 900 call to a service provider location 140. In this manner, toll switch 120 selects the route for the call to service provider 140 via toll switch 130 of the toll network. Other alternative arrangements of the APN call are known but not shown by the drawing. For example, as already described, there are typically one or more intermediate toll offices between toll switch 120 and toll switch 130. Also, for example, the service provider 140 may in fact be linked through the LEC 150 for a particular call (not shown).

Now aspects of our method for providing called service provider control of caller access to pay services, either pay per product or pay information services, will be more fully described with reference to FIG. 1.

Ani Blocking

By ANI, in the context of this disclosure, it is not intended to represent only the telephone number of the calling party 101 or, alternatively, their credit card number or PIN or all three. ANI is intended to represent further identification data as well and may, for example, comprise further caller identification data that may be provided in response to prompts from announcement system 19 including name, address, social security number and the like. The term blocking means interrupting call progress as early in the telecommunications network as possible and especially at originating toll switch 120 and so long as the blocking is accomplished prior to service provider equipment 140.

Having defined the term ANI blocking, attention will now be paid to its implementation. Conventionally, NCP 170 maintains and updates a first ANI blocking table directed to toll network calls generally. When calling party 101 calls called party 160, the normal progress of a call involves looking-up the ANI for calling party 101 in a first ANI blocking table to determine if the call should proceed. If the ANI is not found in the first table, the call is put through. In accordance with the present disclosure, a second ANI blocking table is maintained and is updated by one or more pay service provider sponsors of a service such as MultiQuest Telecommunications Service. In practice, when a sponsor inputs data to the second table via control center 195 that a caller should be limited or restricted from accessing 900 pay service (for example, because of insufficient credit, non-payment or other reasons), the caller's ANI data is stored, maintained and may be updated from time to time in the second ANI data table at the NCP 170 for the service provider sponsor.

Storing restriction data in the second ANI table is actually the final step in calling party 101 (end user) management. The present method preferably should exhaust all other means of trying to limit the callers access to pay services or to collect from the caller and, as a last result, the caller is blocked from using 1-900 pay services. For example, other identification or form of payment data may be prompted for in order to permit the call to go through on a limited basis, for example, if the caller can offer a more secure form of payment. This sponsor provided ANI data table also may contain a list of those ANI data that are subscribed to by callers who have been restricted from accessing 900 service by sponsors because of other reasons, for example, calls from mental hospital and prison telephone numbers.

Once implemented, ANI blocking protects the sponsor from delivering products or providing valuable information to specified callers who, for example, are known not to pay for 900 pay services in the past or have a chronic history of adjustments or for other reasons. Further, the feature protects the toll network operator by preventing an expensive recourse and adjustment process or investigation. The second ANI table provided for and maintained by the sponsors also prevents the call from being routed through the toll network, leaving the resources available for other customers.

The sponsor ANI data table may be administered and controlled locally by the operating system center 185 and/or remotely from the control center 195, through automated feed from a sponsor's billing platform (not shown) or some other link (not shown). The data is entered into the operating system memory through an appropriate user interface, automated feed or other data entry. Appropriate control signals and data are then passed into the NCP 170 platform to establish that an update has occurred and the new or updated ANI tabular data is ready for application.

The LEC 110 (150) feeds billing name and address data for an ANI to update either the first or second ANI tabular data with further identification data enabling, for example, name and address data prompting and comparison of calling party input data with tabular data. All the data, for example, calling party name, address, telephone number, credit card number, etc. can be used to track callers who do not pay for 900 pay services. For example, when an LEC 110 (150) disconnects a subscriber to local service for non-payment, the subscriber may be automatically input to the sponsor ANI tabular data as well as that maintained for a telecommunications service provider. On the other hand, a new LEC subscriber without a history of non-payment will be prevented from being blocked from 900 service access unless they have already appeared in the sponsor provided table for non-payment of 900 pay services.

Now the operation of ANI blocking will be described. Calling party 101 dials a particular 900 service, for example, at 1-900-NXX-XXXX. LEC 150 (if not bypassed) or the originating toll switch 120 recognizes the 900 number as a toll network routed call and routes that call to the originating toll switch 120. The ANI and number dialed are forwarded to the originating toll switch 120 (if ANI is available). The 900 number the caller dials identifies the service provider uniquely and the ANI helps to identify the caller.

The originating toll switch 120 receives the 900 number and formulates a query to the NCP 170. The query message contains the 900 number dialed and the ANI, if available. When the ANI is not available, the toll switch 120 provides the number plan area (NPA) identified by the trunking sub-group incoming from the local exchange carrier and may fill the rest of the data field for the telephone number of the calling party with 0's indicating data not available NCP 170 executes the call processing logic located either at NCP 170 or toll switch 120 as requested by the operating system 185 (is the 900 number dialed a member sponsor?). Also, the call processing logic instructs the NCP 170 to compare the received ANI data to the ANI data of the sponsor provided ANI table. If the ANI appears in the ANI table (the caller appears to be undesirable for one reason or another), the call processing logic instructs the toll switch 120 to instruct the announcement system 190 to play an appropriate announcement or request further information such as method of payment information or further identification. The announcement, for example, may request the calling party 101 to dial an 800 number and talk with a representative of the 900 service sponsor to have their 900 service restored. The call may be blocked after the announcement is played (or as will be further described herein, further identification data may be prompted of the calling party 101). If the ANI data received does not match any undesirable ANI data in the ANI table, the call processing logic instructs the NCP to execute the sponsor's call processing logic.

The NCP 170 accesses the customer account for calling party 101. In accordance with typical practice, NCP 170 further identifies the sponsor location from a 900 number translation. Thus, NCP 170 selects a terminating action point numbering (APN) or terminating POTS (Plain old telephone service) number and returns billing and routing information to the originating switch 120. The originating switch may log the toll call data via automatic message accounting (AMA) equipment 125. However, originating switch 120 may be modified to accept a signal from operating system 185 to not log the call as a toll call, for example, depending on whether the pay service sponsor is a pay per product sponsor or a pay for information sponsor.

In a pay per product call or an automatic information call, the call need not reach service provider equipment 140. On the other hand, in a pay for information call where a live service representative is involved, the originating switch 120 routes the call across the toll switched network through any intermediate offices as necessary to the terminating switch 130. The terminating switch 130 delivers the call to the sponsor's location 140 where the call is answered by the next available pay information service representative. (In the automatic information call, a queried database may simply automatically deliver, for example, a sports score to a caller, thus, there is no need for a service representative in such a call.) Upon receiving answer supervision, the originating switch 120 begins timing the call via the AMA equipment 125, as appropriate, to record the calling party, called party, beginning of answer and disconnect.

The limiting or restricting effects of the sponsors' ANI blocking table may be overridden by the caller's providing account plus PIN or other identification data when ANI is unavailable or determined to be invalid or by achieving a high caller score as further described below.

Account Plus PIN or Other Identification Data

This feature relates to a situation where a caller or LEC 110 has not provided enough information to satisfy the sponsor of a 900 information service that his call should be completed, for example, where ANI data is not available (NCP 170 receives all 0's for the calling party's number) and where the 900 pay service provider sponsor wishes to obtain additional information. Sponsors presently suffer a high uncollectible debt, for example, from areas where ANI is not available. When no complete ANI data is available or it is determined to be invalid for some reason, the sponsor is left with simply a number plan area to identify the caller only to a local switch where the call originated. The calling party's identity, such as their personal telephone number or credit card number is not known. Update ANI records from the LEC 110 are sometimes received late (or not at all). Losses resulting from LEC 110 shortfalls can accumulate to several hundred thousands of dollars per month.

On the other hand, it is expected that by prompting callers for at least account number plus PIN for just non-ANI calls, all callers from areas without ANI would not be blocked. The percentage of calls from such areas, although seemingly insignificant at just 2%, would increase and will generate a considerable increase in revenues to sponsors.

Account plus PIN validation is accomplished through the NCP 170. The NCP 170 executes instructions from the operating system 185 to test for the availability of ANI for a particular call from a particular calling local area via toll switch 120. When ANI is not available on the call, caller 101 is prompted by announcement system 190 to enter an account number and PIN (or to call a sponsor service center to set up an account). This feature may be used to qualify good callers whose ANI is not forwarded to the toll network from the LEC 110, and can be extended to other situations where the ANI is received but does not appear to be valid, or still other situations when the call would be otherwise blocked. Thus, to prevent loss of revenues, announcement system 190 prompts the caller for further identification information (or form of payment information) to assure identity and form of payment if the original ANI data is insufficient in any way (either through fault of the LEC 1 10 or for other reasons as well).

Prompting for further identification data such as account plus PIN benefits both the sponsors and the toll network service provider to eliminate fraud from non-ANI areas and stop the loss of revenues by delivering products or pay information services to those who would otherwise not pay for them. To the contrary, a new revenue stream is opened to at least the 2% of all areas which do not have ANI presently.

Before implementing such a feature, a warning announcement must be played to non-ANI area callers for a period of three months under FCC rules. The warning announcement will advise: 1) that LEC 1 10 does not provide ANI forwarding to their toll carrier, 2) that their toll carrier must block the call unless they enter further information and 3) they may open an account and 4) the caller is not going to be charged for hearing the announcement. When a caller contacts service center to open an account, the operating system 185 may record social security number, name and address plus account and PIN number, once established, or other caller identification data. With this information, the sponsors of the present service may be assured that 1) the caller can be prompted to provide a match of one or more of this data with stored data in the sponsors' database and 2) the call will likely go through in non-ANI areas or whenever the ANI data forwarded from the LEC 110 is insufficient or invalid.

Referring again to FIG. 1, the account plus PIN validation feature will be described in further detail. As before, the caller 101 dials the number of a pay information service provider, for example, 1-900-NXX-XXXX from, for example, an area where the ANI data is not forwarded by the LEC I 10 to the originating switch 120. The LEC 110 recognizes the 1-900 number as a toll network call and routes the call to switch 120. As already described, the called number is forwarded as well as the trunk sub-group number of the end office switch of the LEC 110 with 0's in the unknown data field. A query is formed to the NCP 170 containing the 900 number dialed and what is available of the ANI. When the ANI is not available, the originating switch 120 records only the trunk sub-group from the LEC's end office and the 0's as empty field identifiers.

The NCP 170 executes the call logic which instructs the NCP 170 to compare the deficient ANI to the sponsors' ANI table. Since there are all 0's in the field, there exists a predetermined signal to handle the call specially. More specifically, NCP 170 instructs the toll switch 120 to have the announcement system 190 prompt for account and PIN (or other missing data). The account serves to identify ANI and the PIN personally identifies the caller. If the caller does not provide their account and PIN within a preselected time interval, the caller is instructed to call an 800 or other number to obtain an account number or to hang-up. If the caller fails to correctly enter their account and PIN, a second try may be provided. If there is still a problem, the call may be disconnected.

With the entry of the digits for account number plus PIN, the NCP 170 reads the digits and formulates a query message to query the sponsors' database 180, for example, in a billing platform (not shown) for recording credit history. A reply to the query should be provided within less than 200 milliseconds. Consequently, the shared database 180 is ideally co-located with NCP 170. The reply may be 1) no match 2) low score (as will be described further herein) or 3) a "pass" signal, referred to herein as a post record signal, indicating that the account number plus PIN passed the validation and scoring test. In the latter case, the call processing continues.

NCP 170 further maintains a control program which reads and determines a call processing action based on the responses described above, With a "no match" reply, NCP 170 requests an announcement to be played that the number is invalid and the caller can try again or call a number for a service center to establish an account or resolve the problem. With a "low score" reply, NCP 170 may limit or restrict the call if the call is anticipated to be a costly call or pass the call (for example, if it is a $1.00 sports score call). Embodiments of the caller scoring feature will be further described herein include forwarding the score itself and comparing the caller score with a sponsor entered required score to receive their pay service. The call may be passed or denied depending on the result of the score comparison. Of course, if a "post record" response is received, the caller has passed a validation check and, although the products or services they purchase may be limited, call processing will continue.

If the call is allowed to proceed, a route is selected to toll switch 130 and to service provider 140 via APN, if necessary. Also, the AMA recording of the call is initiated upon answer at provider 140, the call is supervised for disconnect and the disconnect time likewise recorded on the AMA recording system if the caller is to be charged according to the call's duration.

Caller Scoring

Caller scoring relates to scoring a user of 900 pay services as the caller builds a credit/payment history and including their score in the sponsor database 180. The scoring may be made up of a number of factors such as the caller's credit report, payments made on time, frequency of calling, cumulative 900 pay service usage, refunds requested, etc. A sponsor may limit call duration or caller credit or restrict access to their 900 service number based upon the caller's score. As will be described below, a sponsor may balance their program between the price points for their product/service and the uncollectible risk. Sponsors can control the amount of uncollectible risk they are willing to accept for their particular 900 service application by adjusting the score they predetermine as acceptable caller criteria. If the service is a health advice information line where the expected cost may be high, the required score may be high for call completion. A per call fee that is below one dollar may result in a very low caller score set by a sponsor. In any event, it is the sponsor who sets its own scoring algorithms and product or service access requirements.

It is expected that a sponsor initially credits a new caller with a default caller credit score The default score may be set by the sponsor and applies to callers who have no history placing 900 service calls to the sponsor. Alternatively, the default score may be the same for all sponsors. It may be set higher if the caller's telephone number does not appear in the telecommunications service provider's ANI blocking table. As the caller places calls and pays for products or information services provided by the sponsor, the caller credit score (CCS) may be automatically updated by the sponsor from their billing platform (not shown). Of course, a caller may request a higher score by calling the sponsor and providing evidence that they deserve a higher score, for example, by providing further credit information, agreeing to a more secure form of payment and the like. The caller may request that they be directly billed through the telecommunications service provider, through a credit card, or establish an account with the sponsor or later select any one of these through caller prompting.

Referring to FIG. 2, there are shown associated tables, a CCS table 201 associated with a MCS table 202. CCS table 201 is preferably a shared table that all sponsors have access to. Original or default scores may be established through consultation with the network service 10 provider. Alternatively, or in addition, the caller credit score may be stored on a per sponsor basis. In other words, access to changing the caller score may be limited such that all sponsors must agree to change the score. On the other hand, the CCS score may be maintained on a per sponsor basis. The CCS table shows an ANI/ACCT number and a caller credit score. The CCS score is updated as purchases of products are made and/or pay for information calls are paid for.

The MCS table 202 shows a minimum credit score MCS on a per sponsor basis. The MCS, is high, represents an expensive product/pay for information call and a high credit threshold.

A low MCS represents am inexpensive product/pay for information call and a low credit threshold. In operation, an optional product code MCS may be stored for each product offered by a given sponsor in stead of a minimum credit score threshold for the sponsor.

Differentiated from CCS which varies over time, the predetermined score established by a particular sponsor for their product/service and risk level will be called a minimum credit score (MCS). Thus, at least for each 900 number, there is a MCS table 202 against which the caller's CCS is compared to determine if a call should proceed or a product purchased. The sponsor may change the MCS via the control center 195 through operating system 185. In a pay per product or pay for information service, if the product code changes or the pay information service provided becomes more expensive to provide, so may the MCS, for example, to account for a greater collection risk level for the product or service, for example, for a high product charge for jewelry or appliances.

Now the operation of caller scoring will be discussed in further detail with reference to FIG. 1 and 2. When the caller dials 1-900-NXX-XXXX, the call proceeds as before until NCP 170 is called into action. Referring to FIG. 2, there exists a table such that for each 1-900 telephone number there exists at least one MCS. Also, for each ANI or account number of a caller 101, there exists a caller credit score. Thus, CCS table 201 shows, for example, a CCS of 2 for ANI 908-234-5605. MCS table 202 shows for sponsor 900 service telephone number 900-555-1000 an MCS of 1. Let us assume that the sponsor is a pay for information call, then, a pay for information call by caller 908-234-5605 will be completed to 900-555-1000. On the other hand, a call by caller 908-234-5605 will be blocked to service provider telephone number 900-555-2000 because their score does not exceed or equal the MCS.

In a further embodiment (shown in dashed lines), CCS table 201 may be further differentiated by price points for product/service(s) by product code portion 202a of table 202. A sponsor may establish different MCS's for different price points for products/services. Thus the MCS for a sports call or to purchase an inexpensive product may be at one level and at a higher level for a medical advice call or for purchasing jewelry or an appliance.

The control program for the table may be set up in accordance with conventional comparison schemes. For example, it may be required that the CCS score exceed the MCS score or it may be required that CCS merely equal the MCS to complete the call or purchase the product. The importance of the MCS table 202 is that the caller scoring permits a sponsor to assume their own risk level between a typical information call charge or product cost and caller identity/credit while the CCS table 201 may be accessible by all sponsors.

In one example for CCS processing, if the CCS exceeds or is equal to the sponsor's MCS, then the call will be completed or the product may be purchased as described above. A CCS equal to 0 may comprise a bad account indicator and an MCS/CCS of 1 may be a default score for an inexpensive product/service while a larger MCS/CCS such as 6 may be required for a more expensive product/ service such as jewelry or a medical advice call.

Centralized Announcements

When a sponsor imposes $2.00 or more as a minimum call charge, present FCC rules require the sponsor to provide a message to caller 101 and allow the caller to disconnect without incurring any charges. Currently, this message is provided at the location 140 of the service provider's equipment, According to the method described herein, the announcement is moved as close to the initiation of the 1-900 call as possible, for example, at toll switch 120. The caller dials the 900 telephone number and is routed to the originating toll switch 120 as before. There, the telephone number of the dialed service provider is associated with a particular preamble message stored in memory of announcement frame 190 and loaded by service provider 140 via control center 195 and operating system 185. The call can proceed as before once the message is provided and the caller's ANI data is verified.

Of course, the advantage to the sponsor is that its facilities are preserved for callers and lo no message frame is required at the sponsor location 140. The advantage to the toll network service provider is that network resources are saved depending on how early in the progress of the call the announcement is provided.

Product Codes

Product codes may be established for products/services that may be purchased from sponsors. A pay per product call may be terminated as early in the network as possible. An announcement system may prompt a caller to enter a product code, for example, from a catalog or from viewing a home shopping channel or other means and quantity desired. From the called 900 telephone number, NCP 170 can determine that the call is not to be billed to the caller 101. From the received ANI for the caller, the CCS for the caller 101 is retrieved as described above. The MCS for the sponsor (or the MCS for the sponsor's product) is then compared with the CCS for the caller. If the caller meets the predetermined sponsor criteria for purchase of the product(s) offered, then, the caller will be permitted to automatically purchase the product through the sponsor vendor.

Announcement system 190 further prompts the user through the purchase. Besides the product and quantity, the caller may be prompted to select from three or more methods of payment: billing on the telephone bill, billing through a credit card or direct vendor sponsor billing. The product purchase requires no live operator. Preferably, the caller is billed for the product through the caller's telephone bill according to a greater likelihood of collection than by other means. Alternatively, the caller 101 is directly billed by the sponsor or via a credit card.

The network service provider may obtain a revenue stream for a pay-per-product call through three opportunities: 1) charging a fee for billing the product on a telephone bill, 2) recovering transport charges for transporting the call across the toll network and 3) charge a fee for membership in a sponsor club whereby, for the fee, the network service provider maintains and services a sharable database of caller data and may further provide caller scoring services. Advantages to the sponsor are that the transport charges are saved when the call is terminated at the originating office and the call is totally automatic saving sponsor resources. The sponsor needs to interface with the network service provider during the call for the limited purpose of accepting the order, assuring the requested quantity is available and shipping the product since invoicing preferably occurs through the network service provider.

In operation, the call proceeds described as above for a pay for information call. ANI and DN are received at originating toll switch 120. ANI is captured and the credit history recovered including caller score CCS. The DN is also captured, vendor sponsor club membership determined and the normal recording of the call for toll purposes via AMA equipment 125 is suspended. The caller is terminated in announcement system 190 which forwards received product code and quantity for processing to determine MCS in accordance with table 202/202*a*. Moreover, vendor sponsor information is accessed to determine if sufficient quantity of product is in stock. If the CCS is greater than the MCS, announcement system 190 so informs the caller that the transaction may continue. The caller 101 is prompted for their selected method of payment. The method of payment may be preselected in an alternative embodiment. The caller is then signaled that the product order is accepted and shipping details, along with invoicing details as necessary, are forwarded to the vendor sponsor for further processing.

Figure 3:
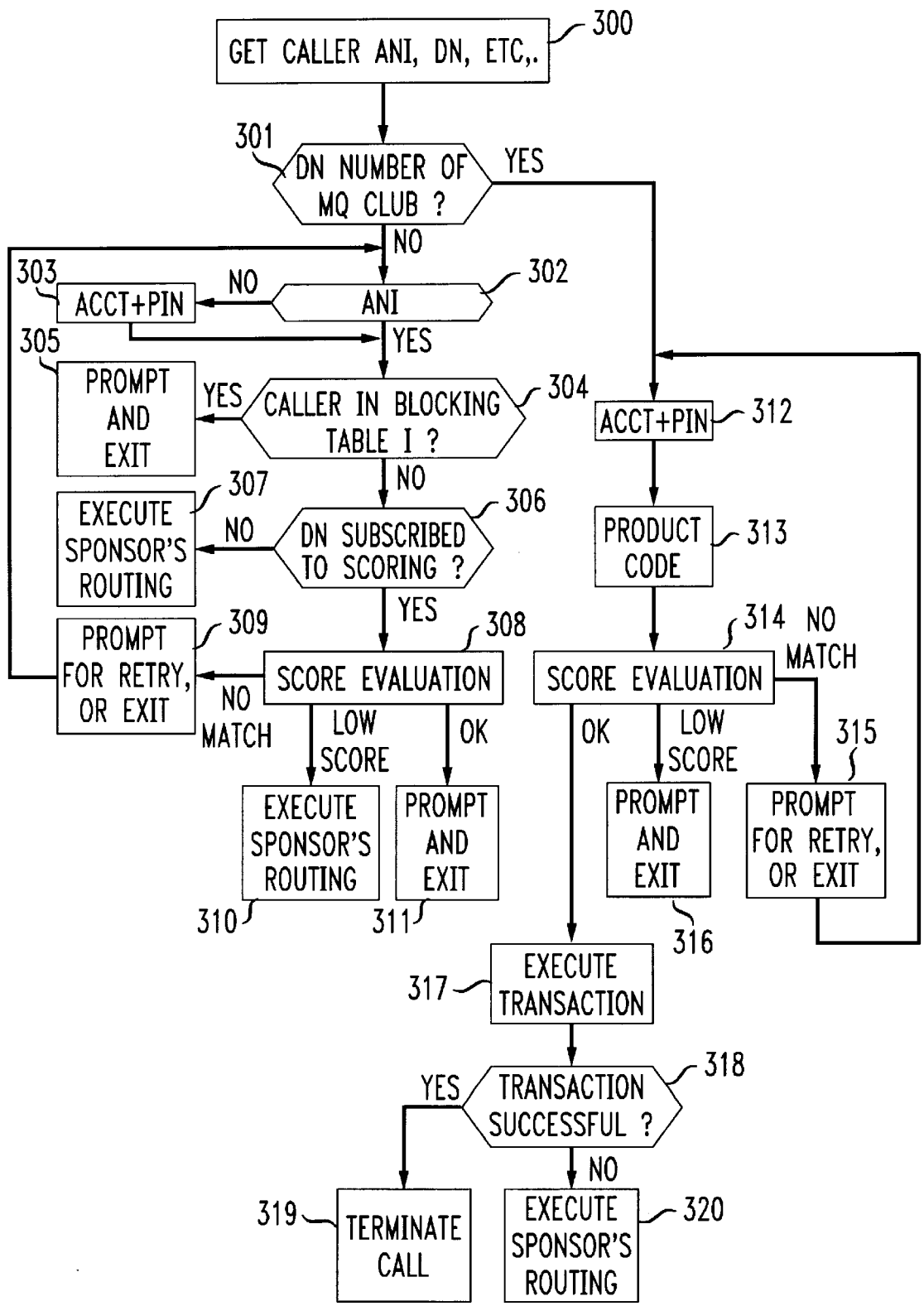
FIG. 3 is a flowchart of a process for providing control of access to pay services.

FIG. 3 is a flowchart of the ANI blocking, account plus PIN validation, caller scoring and product code features ofthe present disclosure. Steps 300–320 are steps that are performed, for example, at originating toll switch 120 which, for example, comprises an electronic toll switching system including a toll switch, call processing algorithms, memory and the like operable under computer control. When a caller accesses the telecommunications network, information about the call is accumulated in block 300 and forwarded to NCP 170. When control passes to block 301, a determination is made whether the destination number (DN), which is the number the sponsor presents to the public, corresponds to a sponsor who is a member of a select "club" (for example, the MultiQuest or the MQ Club of AT&T).

The MQ Club or sponsor club is a "club" of sponsors whose business is to sell products to the public through the telecommunications network. When the DN is determined to not be a member of the "MQ Club", then the call is likely a pay for information call and control passes to block 302 where a determination is made whether block 300 received ANI information. If the determination is in the affirmative, control passes to block 304. Otherwise, control passes to block 303 where the calling party is prompted to provide an account number and PIN information, and the calling party's response is captured and stored in memory. With this information, a first ANI table may be accessed to determine if the call should be blocked. Thereafter, control also passes to block 304.

As indicated above, the network maintains, for example, in shared database 180, a first ANI blocking table which identifies calling parties. Those are parties which the telecommunications service provider has decided to be poor risks and, therefore, the telecommunications service provider has decided that they are not worthy of receiving access to the pay services disclosed herein. Block 304 determines whether the calling party is found in this first ANI blocking table. If the calling party is so found, control passes to block 305, where an appropriate message is given to the calling party and the communication with that party is terminated. When the calling party is not found in this table, control passes to block 306.

Block 306 determines whether the sponsor corresponding to the DN subscribes to the "Caller Scoring" service offered by the telecommunications provider. As indicated above, this is a service whereby callers are rated and, based on their rating and a figure of merit given by the called DN's sponsor, a service is provided to the caller or denied to the caller. The rating as described above is done in accordance with an algorithm selected by the service provider, based on information available to the service provider (either from its own experiences or from information provided to the service provider by sponsors).

For sponsors who do not subscribe to Caller Scoring, control passes to block 307 where the sponsor's routing instructions are executed, and the calling party is thereby connected to the sponsor. For sponsors who do subscribe to Caller Scoring, control passes to block 308 where the calling party's score is evaluated, as described above, to result in one of three conditions: no match, low score, and passed or okay ("ok"). Under a "no match" condition, control passes to block 309 where the calling party is prompted to re-enter its account number and PIN information (in case the calling party entered the wrong information in error) and control returns to block 302. In cases where the calling party does not provide an account number at all (and the ANI is not available) or has repeatedly entered the wrong information, block 309 provides the appropriate message and terminates the connection. Under a "low score" condition, control passes to block 310 where the calling party is again given an appropriate message and the connection is terminated. Lastly, under the passed or "ok" condition, control passes to block 311 which executes the sponsor's routing instructions, thereby connecting the calling party to the sponsor information service provider, if the call requires a live service representative.

Returning to block 301, when the sponsor corresponding to the DN is a member of the "MQ Club", control passes to block 312 which, like block 303, prompts for and accepts the account number and PIN information from the calling party. From the DN, it is recognized that the sponsor is a pay-per-product vendor. The caller is not to be charged for the call and AMA recording is aborted. Thereafter, control passes to block 313 where the calling party is prompted for information regarding the product code and quantity (and other information such as method of payment information) that the sponsor needs in order to fulfill the calling party's purchase request. Control then passes to block 314 where the calling party's score is evaluated and compared to the threshold score required by the sponsor for the purchase of the requested product. Results of the evaluation yield one of three conditions: no match, low score and okay. Under a "no match" condition, control passes to block 315 where a prompt is given to the calling party and control returns to block 312, or a different message is given to the calling party and the call is terminated. (The operation of blocks 314 and 315 parallels the operation of blocks 308 and 309.) Under a "low score" condition, control passes to block 316 where a message is given to the calling party and, again, the call is terminated. Under the "passed" condition, control passes to block 317 where the transaction requested by the calling party is executed. That is, the telecommunications service provider accesses the sponsor's databases and ordering subsystems and takes whatever action is necessary to fill the requested order. Moreover, responsive to an indication that the product will be shipped, the product charge may be automatically posted to the caller's telephone bill, if the caller has so selected. Since this effort might not be successful (for example, the product is not in stock), the results of block 317 are evaluated in block 31 8. When the transaction is successful, control passes to block 319, which terminates the call. When the transaction is unsuccessful, control passes to block 312 where, in FIG. 3, the sponsor's routing instructions are executed (e.g., to a sponsor's representative to speak to the calling party about the purchase). It may be noted that in cases of a successful transaction completion in block 317, the calling party is never connected to the DN. This saves substantial network resources and transport charges.

Thus there has been described a method for providing called service provider control of caller access to pay services which meets the objectives described of providing sponsors with a means for controlling calls to their information bureaus and assuring a greater degree of collectability of call or product revenues. As the Internet eventually provides an alternative network form for the provision of pay services, pay services may be implemented in keeping with the present invention, and the invention should not be considered limited to 900 telephone services only. Consequently, any terms in the claims should be broadly construed such as "caller" and "called party" such that they may read on users of pay Internet service users and service providers respectively. Moreover, any U.S. patent or patent application referred to herein should be considered to be incorporated by reference as to any subject matter deemed necessary for a proper understanding of the claimed subject matter. The invention should only be deemed to be limited by the scope of the claims which follow.

What we claim is:

1. A method carried out by a telcommunicatioms service provider in a network for providing called service provider control of caller access to pay services comprising the steps of:

storing pay service provider criteria based on caller scoring for completion of a pay service call, establishing by said telecommunications service provider a default caller score in real time for a caller having no purchase history with said pay service provider, determining if the pay service provider criteria is met, and blocking call progress by said telecommunications service provider at said originating toll switch if the pay service provider criteria is not met, the pay service provider being a different pay service provider than said telecommunications service provider.

2. A method for providing called service provider control as in claim 1 further comprising the step of determining if network service provider criteria based on caller scoring is met.

3. A method as in claim 1, said criteria storage step comprising the step of storing undesirable number identification data based on caller scoring below a predetermined level.

4. A method as in claim 1, said criteria storage step comprising the preliminary step of establishing a caller score table and a minimum caller score table.

5. A method as in claim 4, said preliminary step of establishing a minimum score table comprising the step of associating a service provider with a minimum caller score.

6. A method as in claim 3, further comprising the steps of determining if an originating toll switch provides number identification data and, if not, prompting the caller for said data from said originating toll switch in said network.

7. A method as in claim 6, wherein the prompted for data comprises an account number.

8. A method as in claim 1 further comprising the step of storing a preamble announcement for the service provider, the announcement provided via a toll switch of a toll network as close as possible to the caller when the caller dials a pay service provider.

9. A method as recited in claim 6 wherein said caller score is increased dependent on caller activity.

10. A method as recited in claim 4 wherein a caller score from said caller score table is compared with a minimum caller score from said minimum caller score table to determine if the caller should be blocked from call progress.

11. A method as recited in claim 10 wherein said caller score is increased dependent on caller activity.

12. A method as recited in claim 10 wherein said comparison of said caller score with said minimum caller score comprises the step of determining if the caller score is greater than or equal to the minimum caller score.

13. A method as recited in claim 1 wherein said pay services call is to a pay services telephone number.

14. A method as recited in claim 1 wherein said blocking step is performed at an originating toll network office.

15. A method as recited in claim 1 wherein said caller access to pay information services is provided via the Internet.

16. A method as recited in claim 13 wherein, responsive to receipt of said pay services telephone number, the network charges the caller for a pay for information services call and does not charge the caller for a pay for product call.

17. A method as recited in claim 13 wherein, responsive to receipt of said pay services telephone number, the pay service provider criteria based on caller scoring is retrieved from storage located proximate to an originating toll switch.

18. A method as recited in claim 16, wherein, in the event of a pay-per-product call, the product charge appears on a telecommunications service bill.

19. A method carried out by a telecommunications service provider in a network for accepting an order for a product comprising the steps of:

receiving ANI and destination pay services telephone number by said telecommunications service provider at an originating toll switch;

responsive to the received ANI, retrieving a caller score corresponding to the caller ANI at said originating toll switch, said caller score being a default score, established in real time, for a caller having no purchase history with said pay services;

responsive to the received destination number, identifying a vendor sponsor and aborting charging for the call;

terminating the call in an announcement system;

receiving product and quantity input from the caller;

determining a minimun caller score responsive to the product and quantity input;

comparing one of the caller score and default caller score with the minimum caller score to determine if the order should be accepted; and invoicing the product on the caller's telephone bill if the order is accepted.

20. A method as recited in claim 19 further comprising the step of:

providing customized announcements to the caller at the originating toll switch.

21. A method as recited in claim 19 further comprising the steps of:

determining if said ANI received from a local exchange carrier is insufficient to identify the caller and prompting the caller for the ANI.

22. A method as recited in claim 1, wherein said pay service provider is a pay for product provider.

23. A method as recited in claim 1, wherein said pay service provider is a pay for information provider.

24. A method as recited in claim 1, wherein caller scoring is based on caller's payment history.

25. A method as recited in claim 1, wherein caller scoring is based on caller's credit history.

26. A method as recited in claim 1 further comprising the steps of:

determining identity of caller and calculating a caller score for the identified caller from one of caller's credit report, payment history, and credit history.

27. A method as recited in claim 13 wherein said pay services call is to a 900 telephone number.

* * * * *